Aug. 14, 1934.  J. GSTYR  1,969,841
GEAR CUTTER
Filed Dec. 24, 1932  2 Sheets-Sheet 1

Inventor
Joseph Gstyr
By
B. F. Schlesinger
Attorney

Inventor
Joseph Gstyr
By
Attorney

Patented Aug. 14, 1934

1,969,841

UNITED STATES PATENT OFFICE 1,969,841

GEAR CUTTER

Joseph Gstyr, Rochester, N. Y., assignor to Gleason Works, Rochester, N. Y., a corporation of New York Application December 24, 1932, Serial No. 648,759

17 Claims. (Cl. 29—105)

The present invention relates to face mill gear cutters. It includes both a novel method of relief-grinding the blades of such cutters and a novel type of cutter and a novel type of cutter blade.

The primary purpose of the invention is to provide face mill gear cutter blades which are cheaper to manufacture and have a better surface finish than previous types of such blades.

The claims of the present application are confined to the cutter and the cutter blades of my invention. For the purpose of clearness in description, however, reference will be made to the method of relief-grinding cutter blades according to the present invention. It is believed that this will assist in a more complete understanding of the structure of the blades themselves.

To cut efficiently, any metal-cutting tool must be provided with clearance back of its cutting edge. In a face mill gear cutter, the blades are relieved, therefore, on both the sides and tops back of their side and top cutting edges.

While other methods of relief-grinding face mill cutter blades have been suggested, the standard practice up to the present has been to mount the blades in a rotary head and to effect the relieving operation by imparting a reciprocatory relieving motion between the grinding wheel and head as each blade rotates past the wheel. While this standard method is, in general, satisfactory, there is a limit at which the relief-grinding machines can be operated, because if they are operated at high speed, vibrations are liable to be set up by the reciprocating parts. Moreover, there is an inherent time-loss in this standard method due to the necessity for withdrawing the wheel, after each blade has passed beneath it, in order to bring the wheel into position to relieve the next blade.

In grinding the cutter blades of the present invention both these draw-backs can be eliminated. Blades of face-mill gear cutters made according to the present invention have side surfaces which are surfaces of revolution. Their side surfaces are not helical as are the side surfaces of blades made according to previous practice. Blades made according to the present invention can readily be relieved by positioning the blades obliquely in a rotary head, that is, at an angle to the position which the blades would occupy when cutting, and by then simply rotating the head to move the blades in a circular path past a rotating grinding wheel. No so-called relieving motion is required or used. The amount of clearance obtained is determined by the obliquity of setting of the blades during grinding and clearance is achieved because, when the blades are used, they are mounted in a different position from that in which they were ground.

Thus to secure clearance on the sides of the blades of a face mill gear cutter, which is to cut in an intermittent indexing process, the blades are mounted in a rotary head non-radially of the axis of the head and ground in that position. In use, these blades are mounted radially of the axis of the cutter head. Cutting clearance can also be provided on the tops of the same blades, by mounting the blades out of parallelism with the axis of the head and grinding them in that position and by then adjusting them for cutting so that they are parallel to the axis of the cutter head.

Blades of a face mill gear cutter made according to the present invention can be relief-ground much more rapidly than blades of conventional construction, since they can be ground by what is in effect a surface grinding operation and further one in which no timed reciprocation of cutter head or grinding wheel is required. Then, too, because they can be ground by a surface grinding method, a better finish can be obtained on the ground side-surfaces of the new blades than can be secured on conventional blades. The improved finish obtainable on the new type of blades can still further be enhanced too, if desired, by imparting a reciprocating movement to the grinding wheel in addition to its rotation during the relief-grinding of the blades. This last-named reciprocating movement is not to be confused with the reciprocating motion employed in the standard relieving process of the prior art. It is not timed with the rotation of the cutter head and need be only very slight since it is a surface-finishing motion and not a wheel-positioning movement.

Blades made according to the present invention are preferably formed with plane top surfaces. This again lends itself to more rapid production, as will hereafter appear. The top surfaces of blades of conventional face-mill cutter blades are helical like the side surfaces of those blades.

The principal objects of the invention have been mentioned. Other objects of the invention may be apparent hereinafter from the specification and from the recital of the appended claims.

Figure 1:
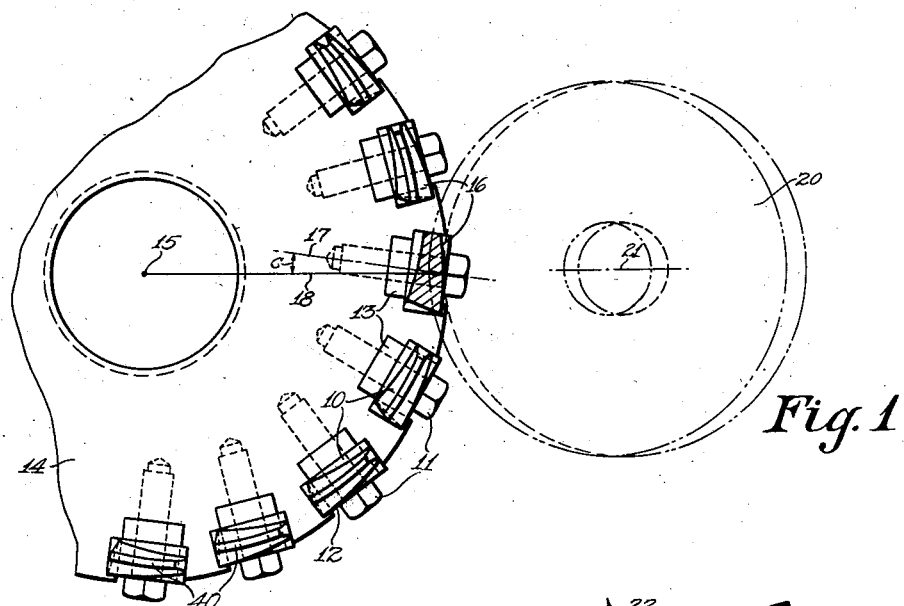
Figures 1 and 2 are a fragmentary plan view and a fragmentary sectional view, respectively, illustrating diagrammatically how the outside surfaces of the blades of a face mill gear cutter made according to the present invention may be relief-ground.
Figure 2:
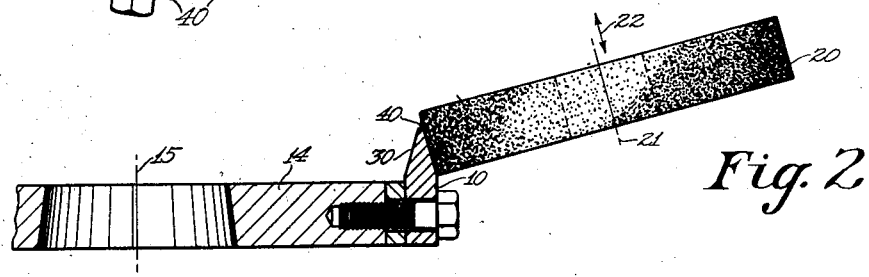
Figure 3:
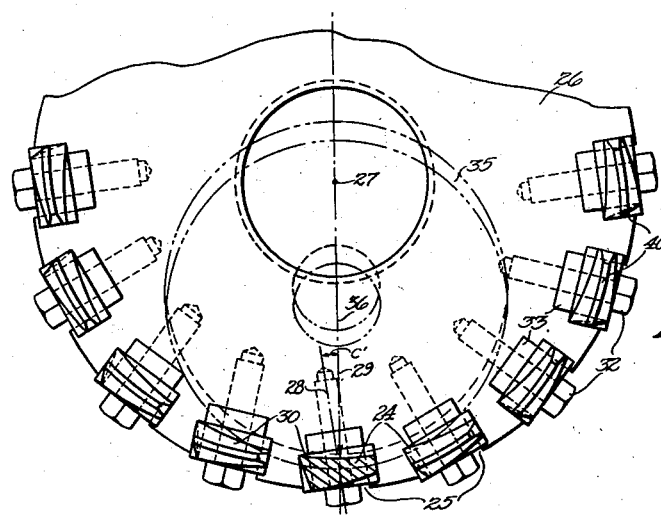
Figures 3 and 4 are similar views illustrating the relief-grinding of the inside surfaces of these blades.
Figure 4:
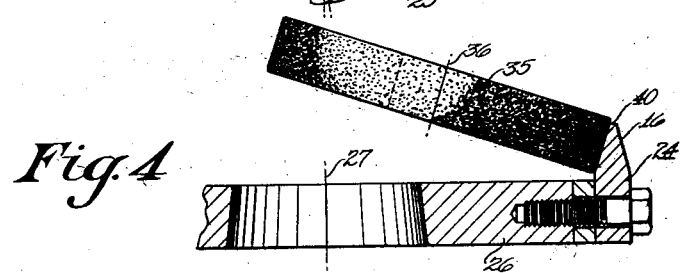

As with face-mill gear cutters of the conventional type, face-mill cutters made according to the present invention have preferably alternate blades provided with opposite side cutting edges. One blade will have an outside edge and the next blade an inside cutting edge. In Figures 1 and 2 I have illustrated how the outside surfaces of the outside blades of a face-mill constructed according to the present invention for cutting gears in an intermittent indexing process may be ground. Figures 3 and 4 illustrate the grinding of inside blades of the same cutter.

Referring first to Figures 1 and 2, 10 designates the outside blades of the face-mill gear cutter and 16 designates the outside surfaces of these blades. To relief-grind the outside surfaces of the blades 10, the blades are secured in a rotary head 14 which, as will hereinafter appear, is different from the head in which the blades are secured for cutting. This dummy head 14 is provided with a series of rectangularly-shaped blade-receiving slots 12 which are non-radial of the axis 15 of the head 14 and the blades are secured in these slots by bolts 11. The angle c of obliquity or offset of the center line 17 of each slot relative to a line 18 radial of the axis 15 of the head, is determined by the amount of cutting clearance desired back of the outside surfaces 16 of the blades. Shims 13 may be used to adjust the positions of the blades radially of the axis 15 of the head.

To grind the outside surfaces 16 of the blades, a cylindrical grinding wheel 20 may be used. The wheel is adjusted so that the line along which it contacts with the surfaces 16 will be inclined to the axis 15 of the rotary head 14 at an angle corresponding to the pressure angle of the outside cutting edges of the blades so as to grind the outside surfaces to the required pressure angle.

The relief-grinding operation is effected by rotating the head 14 and wheel 20 on their respective axes to carry the cutting blades 10 past the rotating grinding wheel 20. The grinding wheel may be fed toward the axis 15 of the head, during grinding, to remove the desired amount of stock from the blades. Very smooth surfaces will be produced on the outsides of the blades by this grinding operation for it is, in effect, a surface grinding operation. The quality of the finish obtainable can be still further improved, however, by imparting a slight reciprocating movement to the grinding wheel as it rotates on its axis. This movement should be in the direction of the line of contact between the grinding wheel and the outside surfaces 16. In the case of the grinding wheel 20, it would be in the direction of the axis 21 of the wheel, as indicated by the arrow 22. This reciprocating movement of the wheel need in no wise be timed to the rotation of the head 14 and only a slight reciprocating movement is required to produce a high polish on the blades.

Where blades 10 having a positive pressure angle are being ground, the line of contact between the grinding wheel and the blades is inclined to the axis of the rotary blade-carrying head, as shown in Figures 1 and 2, and the ground side surfaces of the blades will be sections of a cone. The axis of this cone will coincide with the axis 15 of the rotary head in which the blades are carried during grinding. One of the blades 10 is shown in section in Figure 1 in a plane perpendicular to the axis 15 of the rotary head 14. The intersection of the outside surface 16 with this plane is, because of the method of grinding, a circular arc concentric with the axis 15 of the head.

Where cutting blades having outside surfaces of zero pressure angle are to be relief-ground, the grinding wheel will be positioned so that the line of contact between the wheel and the blades will be parallel to the axis of the blade-carrying head and then the surfaces ground on the blades will be sections of a cylinder whose axis coincides with the axis of the head.

Referring now to Figures 3 and 4, 24 designates the inside cutting blades of a face-mill gear cutter and 30 the inside surfaces of these blades. To grind these surfaces 30, the blades 24 are secured in slots 25 of a head 26 whose slots 25 are non-radial of the axis 27 of the head, but are oppositely directed from the slots 12 of the head 14. The angle $c'$ between the center line 28 of the slots 25 and the line 29 radial of the axis 27 is determined by the clearance angle desired on the inside surfaces 30 of the cutting blades.

The blades 24 are secured in the head 26 by bolts 32 and shims 33 may be employed to adjust the blades to the proper distance from the axis 27 of the head.

The process for grinding the inside surfaces is similar to that for grinding the outside surfaces. A grinding wheel 35, which, if desired, may be identical with the grinding wheel 20, is adjusted into operative relation with the inside surfaces of the blades and in such manner that its line of contact with the blades is inclined to the axis 27 of the head 26 at an angle corresponding to the pressure angle of the inside cutting edges of the blades and then, the head 26 is rotated on its axis to pass the inside surfaces of the blades across the operating surface of the rotating grinding wheel 35. As before, the blades can be ground to the required depth by feeding the grinding wheel in a direction perpendicular to the axis 27 of the head. If a high polish is desired on the inside surfaces, this can be obtained, as before, by imparting a slight reciprocating movement to the grinding wheel 35 in the direction of its axis 36.

The inside surfaces of the blades will be conical if the line of contact between the grinding wheel and the blades is inclined to the axis 27 of the cutter, as shown, while if the grinding wheel is so positioned that the line of contact between the wheel and blades is parallel to the axis 27 of the head, as required for grinding inside surfaces of zero pressure angle, the inside surfaces will be cylindrical. In either case, the surface of revolution ground on the inside of the blades, whether conical or cylindrical, will be coaxial with the axis 27 of the head 26 during grinding.

Figure 5:
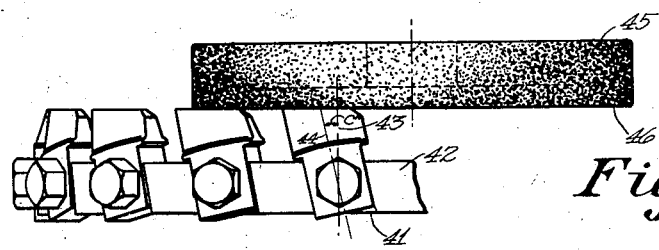
Figure 5 is a fragmentary elevational view, illustrating how the tops of these blades can be ground.

In Figure 5, there is shown the preferred method of grinding the top surfaces 40 of both inside and outside blades of a cutter constructed according to the present invention. Here the blades are secured in slots 41 of a rotary head 42 whose slots 41 are non-parallel to the axis 43 of the head 42. The angle of inclination $c''$ of the center line 44 of each slot 41 to the axis 43 is determined by the clearance angle desired back of the top cutting edges of the blades.

The top surfaces of the blades are ground with a grinding wheel 45 having a plane operating surface 46 which, in operative position, is perpendicular to the axis 43 of the head 42. The top surfaces of the blades are ground by rotating the head 42 to carry the top surfaces of the blades across the operating face of the rotating grinding wheel 45.

When the top surfaces of the blades are ground in the manner just described, these top surfaces 40 will be plane surfaces. It will be realized, of course, that in grinding the top surfaces of the blades, it is not necessary to use a rotary blade-carrying head 42. The top-clearance could be just as well ground on the blades by positioning them at the correct angle and moving them in a straight line across the face of the rotating grinding wheel 45. The rotary head 42, in the case of the top surfaces of the blades, is simply a convenient means for carrying the blades across the operating surface of the grinding wheel.

Since the cutting blades cut on one side only it is only necessary to grind each blade on one side, but it may be desirable for accuracy and appearance in many instances to grind them on both sides. It will be assumed for the sake of illustration that the blades 10 and 24 have been ground on both sides by first positioning them in the head 14 and then in the head 26.

Figure 7:
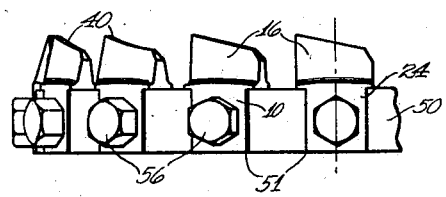
Figure 7 is a fragmentary side elevation of this cutter.
Figure 6:
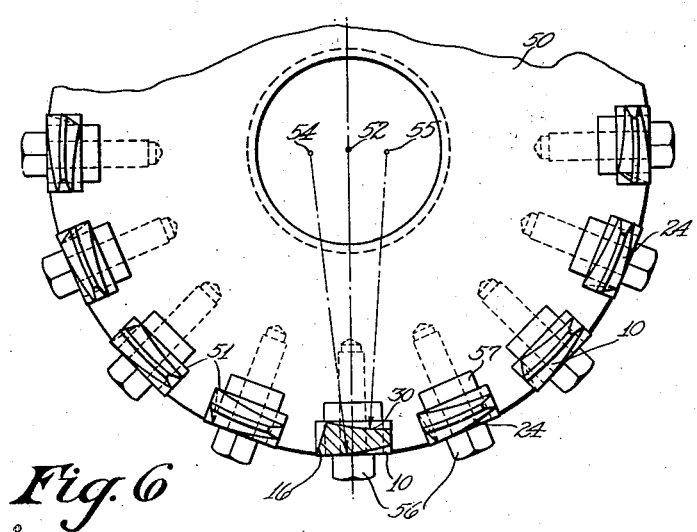
Figure 6 is a fragmentary plan view of one form of face mill gear cutter constructed according to the present invention.

After the side and top surfaces have been ground on the blades, they are assembled in their own head 50 for use. The slots 51 of this head are radial of the axis 52 of the head and parallel to this axis, as clearly shown in Figures 6 and 7. When the blades are positioned in this head, then, the side and top surfaces of the blades will have proper cutting clearance back of the side and top cutting edges. The cone axis 54 of the outside surface 16 of each blade is then offset from but parallel to the axis 52 of the cutter head and the cone axis 55 of the inside surface 30 of each blade is also offset from and parallel to the axis 52 of the cutter head. The two axes 54 and 55 are offset on opposite sides of the axis 52 of the head. The blades 10 and 24 are secured in the head 50 by bolts 56, while shims 57 may be used to adjust the blades in the head.

While the invention has been described in connection with a face mill gear cutter which operates in an intermittent indexing process, it will be understood that the features of the invention are equally applicable to face mill hobbing cutters, that is, to face mill gear cutters which operate in a continuous indexing process. In the second case, as in the first, the angle of obliquity of setting of the blades in the dummy heads for relief-grinding will be determined by the required cutting clearance.

Moreover, while the invention has been illustrated in connection with a type of face-mill cutters whose blades are arranged radially of its axis, it will be understood that the invention is not limited to cutters of this type. Thus, it is applicable also where the blades of a face mill gear cutter are offset, that is, non-radial, of the axis of the cutter head. The blades of such a cutter could be relief-ground by positioning them radially in the relieving head.

The blades shown in the drawings have straight cutting edges and their cutting portions are of trapezoidal cross-section, as clearly shown in Figures 2 and 4. It will be understood, however, that the invention is not limited to this type of blade, since blades having curved cutting edges may be relief-ground also, by the present process. To grind the latter type blades, the grinding wheels will be dressed to provide operating surfaces which are of complementarily curved profile.

In general, it may be said, that the invention is capable of various embodiments and that the present application is intended to cover any adaptations, uses, or modifications of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A gear cutter comprising a rotary head and a blade which extends in a direction generally parallel to the axis of rotation of the head, said blade having a side cutting edge and having a side surface back of said cutting edge which is a section of a cone whose elements extend from the top to the bottom of the side surface.

2. A gear cutter comprising a rotary head and a blade which extends in a direction generally parallel to the axis of rotation of the head, said blade having a side cutting edge and having a side surface back of said cutting edge which is a section of a cone whose axis is offset from the axis of the head.

3. A gear cutter comprising a rotary head and a blade which extends in a direction generally parallel to the axis of rotation of the head, said blade having a side cutting edge and having a side surface back of said cutting edge which is a section of a cone whose axis is offset from but parallel to the axis of the head.

4. A gear cutter comprising a rotary head and a plurality of annularly arranged blades, each of said blades having a side cutting edge and each blade having a plane top surface and a side surface back of said side cutting edge which is a section of a cone whose elements extend from top to bottom of the side surface.

5. A gear cutter comprising a rotary head and a plurality of annularly arranged blades, each of said blades having a side cutting edge and each blade having a plane top surface and a side surface back of said side cutting edge which is a section of a cone whose axis is offset from the axis of rotation of the head.

6. A gear cutter comprising a rotary head and a plurality of annularly arranged blades, each of said blades having a side cutting edge and each blade having a plane top surface and a side surface back of said side cutting edge which is a section of a cone whose axis is offset from but parallel to the axis of rotation of the head.

7. A gear cutter blade having a side cutting edge lying in a side surface which is a section of a cone whose elements extend from top to bottom of said side surface.

8. A gear cutter blade having a cutting portion of trapezoidal cross-section, one of the non-parallel sides of the trapezoid forming an element of a conical surface which forms one of the side surfaces of the blade.

9. A gear cutter blade having a cutting portion of trapezoidal cross-section, one of the non-parallel sides of the trapezoid forming an element of a conical surface which constitutes a side surface of the blade, said blade having a plane tip surface.

10. A gear cutter blade having a side cutting edge and having a plane top surface and a side surface back of said side cutting edge which is a section of a cone whose elements extend from top to bottom of the side surface.

11. A gear cutter comprising a rotary head and a blade which extends in a direction generally parallel to the axis of the head, said blade having a side cutting edge and having a side surface back of said side cutting edge which is a section of a surface of revolution whose axis is parallel to but offset from the axis of the head.

12. A gear cutter comprising a rotary head and a blade which extends in a direction generally parallel to the axis of rotation of the head, said blade having a side cutting edge and having a plane top surface and a side surface back of said side cutting edge which is a section of a surface of revolution whose axis is parallel to but offset from the axis of the head.

13. A gear cutter comprising a rotary head and a plurality of cutting blades which extend beyond one face of the head in a direction generally parallel to the axis of rotation of the head and have opposite side cutting edges, the side cutting edges of one side, at least, being inclined to the axis of rotation of the head, said blades having side surfaces which are relieved back of their cutting edges and which are parts of surfaces of revolution whose axes extend in a direction parallel to the axis of the head.

14. A gear cutter comprising a rotary head and a cutting blade which extends beyond one face of the head in a direction generally parallel to the axis of rotation of the head and which has a cutting edge at one side which is inclined to the axis of rotation of the head, said blade having its side surface relieved back of said cutting edge and forming part of a conical surface of which the cutting edge is an element.

15. A gear cutter blade having a cutting edge at one side and its side surface relieved back of said cutting edge and forming part of a surface of revolution, the elements of which extend from top to bottom of said side surface.

16. A gear cutter blade having a cutting portion which is of trapezoidal shape in cross-section and which has a cutting edge at one side, the side surface of the cutting portion back of said edge being relieved and forming part of a conical surface of which the cutting edge is an element.

17. A gear cutter comprising a rotary head and a cutting blade which extends beyond one face of the head in a direction generally parallel to the axis of rotation of the head and which has a cutting edge at one side inclined to the axis of rotation of the head and its side surface back of said cutting edge relieved and lying in a conical surface, the axis of which is offset from the axis of the head.

JOSEPH GSTYR.